United States Patent [19]
Shepherd

[11] 4,283,154
[45] Aug. 11, 1981

[54] COUPLING DEVICE

[76] Inventor: Joel D. Shepherd, 7441 E. 84th St., Tulsa, Okla. 74133

[21] Appl. No.: 66,034

[22] Filed: Aug. 13, 1979

[51] Int. Cl.³ .............................................. F16D 1/12
[52] U.S. Cl. ...................................... 403/78; 403/400
[58] Field of Search .................... 403/78, 73, 385, 400

[56] References Cited

U.S. PATENT DOCUMENTS

| | | | |
|---|---|---|---|
| 1,706,147 | 3/1929 | Davidson | 403/73 |
| 2,894,773 | 7/1959 | Noe | 403/400 X |
| 2,945,713 | 7/1960 | Sears | 403/73 |
| 3,013,754 | 12/1961 | Hastings | 248/514 |
| 3,764,099 | 10/1973 | Parduhn | 248/214 |

FOREIGN PATENT DOCUMENTS

| | | | |
|---|---|---|---|
| 499851 | 11/1954 | Italy | 403/385 |
| 1322771 | 7/1973 | United Kingdom | 403/400 |

*Primary Examiner*—Andrew V. Kundrat
*Attorney, Agent, or Firm*—R. E. Zimmerman

[57] ABSTRACT

A coupling device comprising a base plate with two attached segments, the first base plate having a circular opening for placement of a second plate with a circular recess as one surface, a third plate suitable for alignment and attaching to the said second plate by two "U" bolts, the first base plate having means for attaching two looped adjustable cables.

5 Claims, 3 Drawing Figures

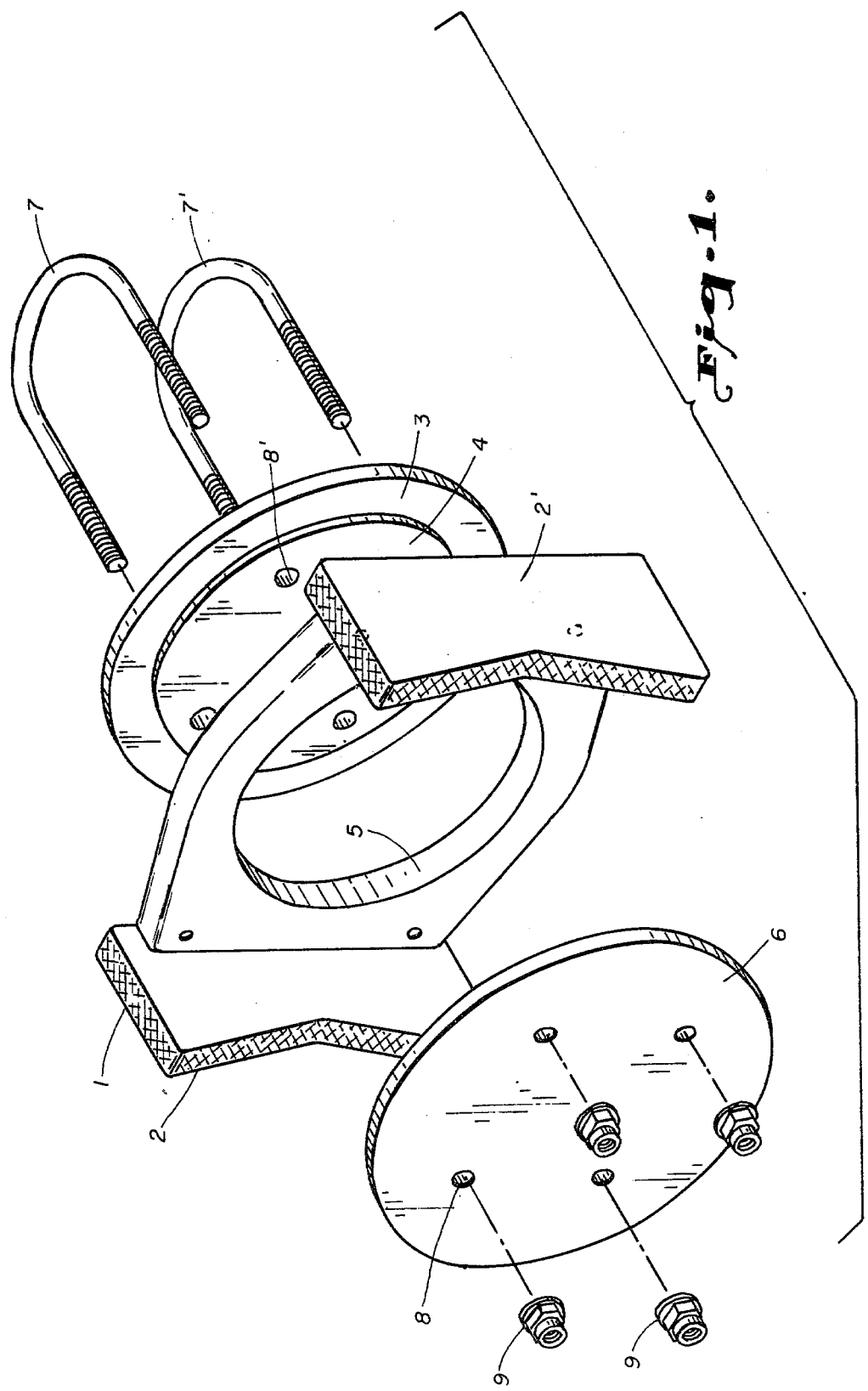

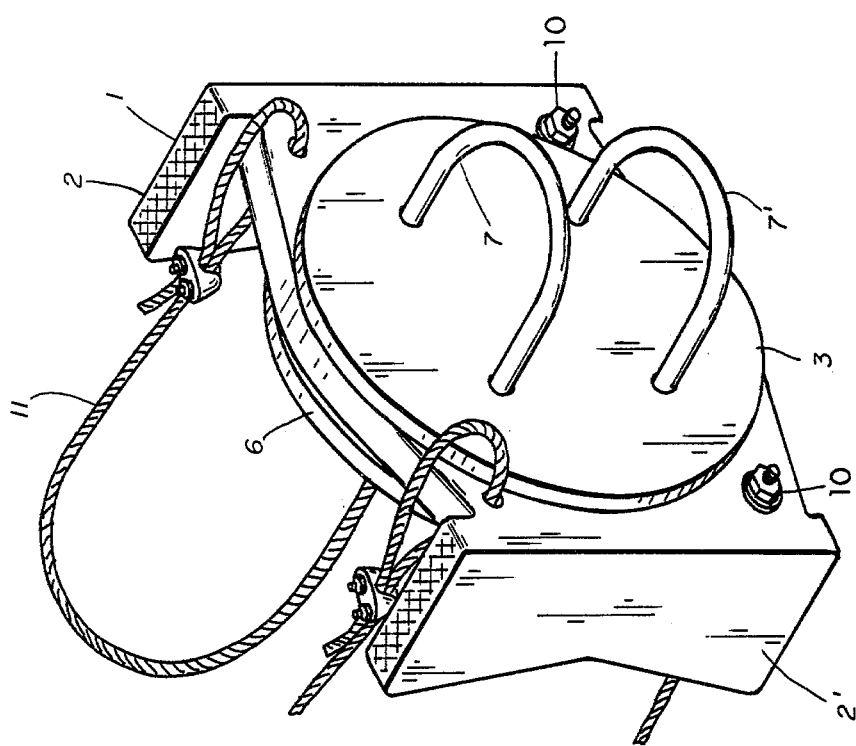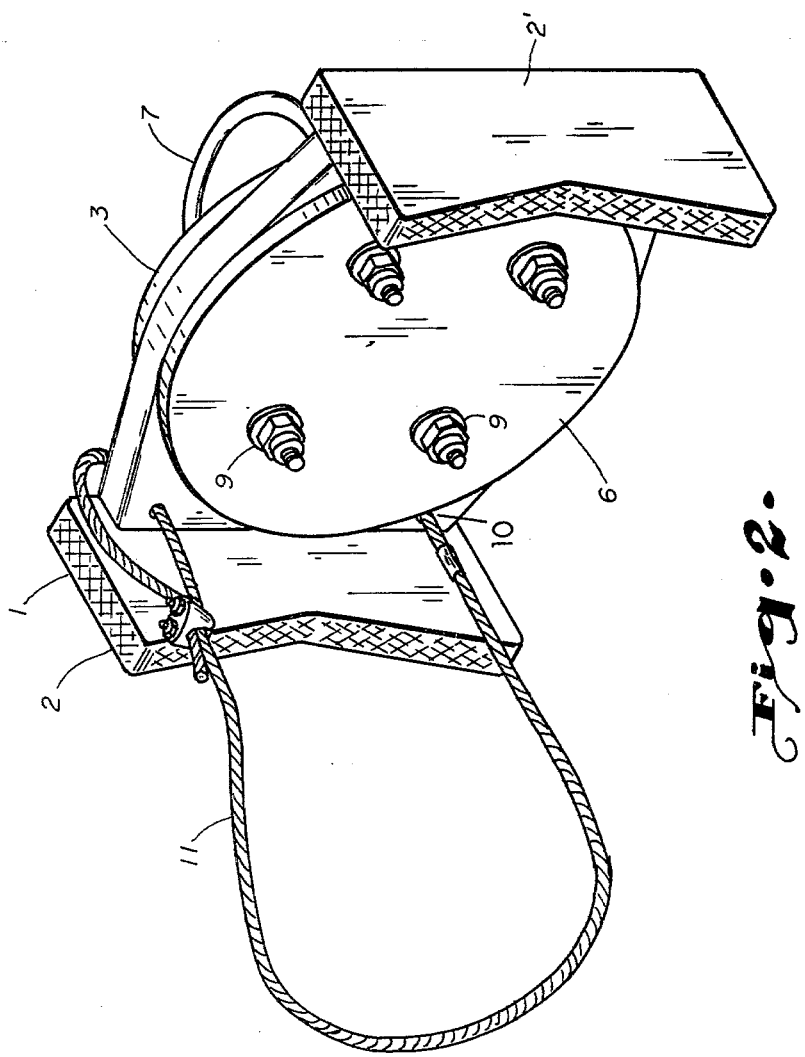

COUPLING DEVICE

This invention relates to a coupling device which is useful as a connection between structures which may have circular surfaces.

DISCUSSION OF THE PRIOR ART

Reference is made to U.S. Pat. No. 3,586,280 issued June 22, 1971 to Parduhn which protrays a signal mast arm bracket useful in adjusting to a plurality of angular and vertical positions when assembled on a mast arm. U.S. Pat. No. 3,764,099 issued Oct. 9, 1973 to Parduhn patentee shows improvement over the former U.S. Pat. No. 3,586,280 issued to him. For brevity the differences of both of the above cited patents shall be discussed in combination since the later U.S. Pat. No. 3,764,099 is an improvement on the former U.S. Pat. No. 3,586,280 patent. The U.S. Pat. No. 3,586,280 patent displays a series of tubular members, two tees, three elbows all in combination connected to a signal light, the combination being connected through a tee to a bracket which fastens to a mast arm. The mast arm supports the signal lights attached thereto. U.S. Pat. No. 3,764,099 shows structural changes in the tubular member shown in U.S. Pat. No. 3,586,280, adding an open threaded section in one end of the tubular member, and a chain and clamping means as part of the bracket to fasten the supporting assembly to the mast arm.

The patent to Hastings, U.S. Pat. No. 3,013,754 dated Dec. 19, 1961, shows a coupling 10, FIG. 1, which attaches to a car bumper to support rod 24, FIG. 5, means of a U-joint 32, FIG. 5.

The patent to Johansen U.S. Pat. No. 2,822,143 issued Feb. 4, 1958, shows an adjustable bracket for attaching an umbrella including a first and a second clamping section.

All of the cited references have structural features which include a design for specific purpose and use. The device which I shall disclose has versatility and novel features which are not shown or suggested in the cited patents.

SUMMARY OF THE INVENTION

This invention provides means for connecting two or more structures into a rigid assembly. The coupling is structured so that the second and third plates connected together can be rotated around the first base plate in a complete circle. The circular plates held together by U-bolts can also be moved in a complete circle giving the coupling greater versatility which is not present in any of the cited references. Adjustable cable connections are included to easily mounting the base plate to any circular structure. The cables and the serrated conformation of the base plate structure allows the coupling to fit closely to the conformation of the various structural members (not shown) so that the base plate will not slide when the adjustable cables are tightened in place.

OBJECT OF THE INVENTION

The main object of this invention is to provide a coupling device which will unite two or more structural members into an assembly.

Another object of this invention is to provide a coupling which has connecting means to connect one structural member to another structural member with means to angularly set the position of one structural member in relationship to the other structural member.

BRIEF DESCRIPTION OF DRAWINGS

FIG. 1 is an isometric drawing showing the components which make up the coupling device.

FIG. 2 is an isometric drawing of the coupling device completely assembled.

FIG. 3 is an isometric drawing of the coupling device completely assembled in a second position.

DESCRIPTION OF THE PREFERRED EMBODIMENT

Reference is made to FIG. 1 which shows the component parts of the coupling device. The base plate is shown as 1 and comprises a surface area with a circular hole therein with two attached similar segments 2 and 2' each with a serrated V-conformation on the outer edges, segments 2 and 2' are positioned approximately perpendicular to the base plate 1. A second plate 3 is fitted with a raised circular surface 4 forming a recessed surface on the surface of the plate 3. The raised circular surface 4 rests in a circular hole 5 located in the base plate 1. A third plate 6 is shown with drilled holes 8. U-bolts 7 and 7' are shown separately and when assembled pass through drilled holes 8' in the second plate 3 and drilled holes 8 in the third plate 6 to be held in place by lock washer and nuts 9. When assembled the second plate 3 can be rotated in a circular direction to position plate 3 with U-bolts 7 and 7' mounted therein to a selected position in relationship to the base plate 1.

FIG. 2 shows the coupling device shown in FIG. 1 in assembly. Base plate 1 with each attached segment 2 and 2' in position is shown. Plates 3 and 6 are shown in place with U-bolts 7 and 7', shown in FIG. 3, secured by lock washers and nuts 9. Adjustable cable support 11 is useful for securing base plate 1 with the segments 2 and 2' to a structural object (not shown). The cable support 11 is mounted at position 10 and is easily adjusted to take up any slack so that the attached segments 2 and 2' shown in FIG. 2 will fit snugly to a structural object (not shown).

FIG. 3 shows the coupling device assembly shown in FIG. 2 in reverse position. The U-bolts 7 and 7' are shown in a mounted position on second plate 3 passing through drilled holes 8 (FIG. 1) and adjustable cables 11 which is shown attached at position 10.

While preferred embodiments of the present invention have been described in detail, various modification, alterations and changes may be made without departing from the spirit and scope of the present invention as defined in the appended claims.

I claim:

1. A coupling device comprising a first base plate with at least two attached segments, each of the said segments positioned approximately perpendicular on the oppsoite ends of the said first base plate, the said first base plate having a circular opening, the said opening being suitable for housing a slidable second plate, the said second plate being structured with a recessed surface on one side so that the said second plate is slidable mounted on the said first base plate, the said second plate having at least one U-bolt passing through it for holding the said second plate in selected positions on the circular opening of the said first plate, the said U-bolt passing through a pair of drilled holes in the said slidable second plate and through a second pair of drilled holes in a third plate, the said U-bolt being fastened securely by a pair of lock washers and nuts.

2. The coupling device as claimed in claim 1, where the said first base plate has a pair of adjustable cable attached through the face of the said first base plate, the said adjustable cables being useful as mounting means for the said coupling device.

3. The coupling device as claimed in claim 1, where each of the attached segments have a serrated V-shaped conformation on the outer edges.

4. The coupling device as claimed in claim 1 where the said means for holding the said second plate comprises at least one U-bolt passing through a pair of drilled holes in the said second plate and through a second pair of drilled holes in a third plate, each of the said U-bolts being fastened securely by a pair of lock washer and nuts.

5. The coupling device as claimed in claim 1 where the said first base plate has a pair of adjustable cables attached through the face of the first said plate useful as mounting means for the said coupling device.

* * * * *